Patented Nov. 8, 1938

2,135,976

UNITED STATES PATENT OFFICE 2,135,976

COMPOSITION OF MATTER AND METHOD OF MAKING THE SAME

Walter J. Koenig, Philadelphia, Pa., assignor to Sloane-Blabon Corporation, Trenton, N. J., a corporation of Delaware No Drawing. Application July 11, 1936, Serial No. 90,188

8 Claims. (Cl. 260—2)

This invention relates to a novel composition of matter, and particularly to a composition adapted for coatings, plastics and the like in which a constituent of the vehicle is adapted to form a resin by condensation at elevated temperatures. More particularly, the invention relates to resinous products derived from the oils, to the method of making the same and to a novel method of drying and bodying oils. It further relates to coatings, compositions, plastics and the like, especially adapted for use in the manufacture of floor covering materials, etc., and to resinous products derived from said oleaginous compositions, the practical application of which will be hereinafter referred to as applied to more specific manufactured products.

This application is a continuation-in-part of my prior co-pending applications, Serial No. 646,148 filed December 7, 1932, entitled—Composition of matter and method of making same,—and No. 758,864 filed December 22, 1934, entitled—Composition of matter and method of making, now Patent Nos. 2,058,596 and 2,108,893.

In my said prior applications, I have disclosed the methods of drying oils by a resin-forming condensation and a number of compositions suitable for drying by such methods. With similar objects in view to those set forth in my prior applications Nos. 646,148 and 758,864, I have now discovered that by combining the oil with certain straight chain organic compounds, desirable results may be obtained and the products will be tough, pliable and comparable with the products obtained in my co-pending applications. In my co-pending application 646,148, I have disclosed straight chain compounds which condense with the drying oil, thereby imparting improved properties to the oil to activate the drying and giving smooth and unwrinkled films.

In my present invention, I have found that certain straight chain organic compounds in the form of alcohols, aldehydes, ketones and unsaturated hydrocarbons, condense with the drying oil in a similar manner as that disclosed and claimed in my co-pending applications. It is important, however, that for practical results and from the standpoint of economy, straight chain compounds that have relatively high boiling points are more desirable. If the boiling point of the compounds is relatively low, the straight chain compound being quite volatile may be lost at the elevated temperature, thereby losing the benefit of the condensation between the oil and the condensing compound.

Comparatively low boiling straight chain organic compounds have been used in my research work, and reaction between the oil and the compounds have been found to occur; however, it may be necessary to have the reaction occurring under pressure in order to prevent the straight chain organic compound from evaporating when the elevated temperature is applied to the mixture. Thus, in order to avoid complicated apparatus and for the sake of economy, I prefer to use straight chain compounds, as will hereinafter be described.

Straight chain aliphatic alcohols having 6 or more carbon atoms have been found to condense with drying oils having double bonds in conjugate arrangement and thereby imparting improved drying properties to the oil. In the case of aliphatic alcohols having less than six carbon atoms in the chain, it is my belief that esterification and alcoholysis occurs in which a primary (or in some cases, a secondary) alcohol group re-esterifies a fatty acid split from the glyceride structure. It is generally recognized that alcoholysis takes place more readily as the size and complexity of the alcohol molecule decreases, and is characterized by a low acid value, about two to three, in the blends made with primary alcohols. As an example, amyl alcohol has a high reaction yield, but the product has a low acid value which appears to indicate that the reaction yield is primarily due to alcoholysis rather than condensation, although some condensation may occur in the case of amyl alcohol. In considering octyl alcohol, eight carbon atoms, the reaction yield is high and the acid value is high, appearing to indicate that the yield is due primarily to condensation. In the case of geraniol, ten carbon atoms, the condensation yield is high and the acid values are high in condensations with raw as well as blown oils having double bonds in conjugate arangement. Diacetone alcohol, six carbon atoms, the condensation yield is high and the acid value is high. Several other aliphatic alcohols which condense with oils having the conjugate double bond structure and thereby impart improved drying properties to the oil, include the following: hexyl, heptyl, nonyl, cetyl, methyl amyl and ethyl butyl.

Straight chain aliphatic aldehydes having three or more carbon atoms condense with drying oils having double bonds in conjugate arrangement giving similar products to those condensation products of the aliphatic alcohols and the condensation product imparts improved drying properties to the oil. Normal butyraldehyde condenses very readily with China-wood oil and gives a high condensation yield in three to four hours at elevated temperatures. Another aldehyde which reacts similarly and condenses with the oil is propyl aldehyde, thereby imparting improved drying properties to the oil. Additional aliphatic aldehydes which condense as described include n-caproic aldehyde, heptaldehyde and octyl aldehyde.

Aliphatic ketones which are suitable condensing agents with drying oils having double bonds in conjugate arrangement include those having five or more carbon atoms in the open chain. Typical examples of this group are methyl isopropyl ketone and mesityl oxide. Methyl isopropyl ketone is a saturated ketone and gives a condensation yield of about 6% in 3½ hours at 500° F. and the condensation product imparts improved properties to the oil. Mesityl oxide, an unsaturated ketone, condenses with both raw and blown China-wood oil in approximately five hours at elevated temperatures and yields hard smooth films in about one to two hours in the case of raw oil. Due to the volatility of the aliphatic ketones at elevated temperatures, the group has been restricted to compounds containing five or more carbon atoms in the chain, but if the condensation reaction is caused to occur under pressure at the elevated temperature shorter chains may be used. Other aliphatic ketones which condense as described include methyl n-amyl ketone and methyl isobutyl ketone.

Unsaturated straight chain hydrocarbons having six or more carbon atoms in the chain have also been found to condense with oils having double bonds in conjugate arrangement at elevated temperature, and the condensation product imparts improved drying properties to the oil. Unsaturated aliphatic hydrocarbon compounds having less than six carbon atoms have comparatively low boiling points and should not, therefore, be used as condensing agents with the oil at elevated temperatures unless the condensation reaction would be carried on, as indicated above, under pressure.

Diisobutylene and octylene condense with oils having double bonds in conjugate arrangement, especially China-wood oil, and the resulting product is a smooth and hard film. These compounds each contain one ethylene linkage and eight carbon atoms, however, it seems that as the unsaturation in the straight chain compound increases, the compound will condense more rapidly with the oil, thereby imparting improved and more rapid drying properties to the mixture.

Other examples of unsaturated straight chain hydrocarbons include diamylene, triisobutylene and hexadiene, which condense with the oil in a similar manner, as described above.

The oils which I prefer to use in the condensation reaction with the straight chain compounds described are, as previously indicated, drying oils in which I include treated and untreated drying oils, treated semi-drying and non-drying oils that possess double bonds in conjugate arrangement (such as, China-wood oil, fish oils, oiticica oil, blown or properly oxidized linseed oil, blown or properly oxidized soya bean oil, blown or properly oxidized perilla oil, blown or properly oxidized poppyseed oil, etc. Castor oil heated under reduced pressures to form conjugate double bond structure and esterified, blown or properly oxidized drying oil fatty acids, and the above treated or untreated oils, having the above double bond conjugate structure, blown with drying oil fatty acids or such oils to which blown or properly oxidized fatty acids have been added). The condition that the treated or untreated oil has double bonds in conjugate arrangement in the oil structure is essential and the invention is, therefore, restricted to those oils. Mineral oils are not included in the scope of my invention. I prefer to use blown or properly oxidized oils, although raw oils having the double bonds in conjugate arrangement will condense with the aliphatic compounds described above, thereby imparting improved drying properties to the oil.

As one example in which improved drying properties are imparted to the oil, I may blend:

| | Parts |
|---|---|
| 7-second blown China-wood oil (at 86° F. Gardiner-Holt test) | 50 |
| Geraniol | 50 |

The mixture is refluxed for five hours at 450° F. and a condensed product is obtained which dries at a temperature of 220° F. into a hard and smooth film in contrast to the irregular and soft films obtained in the case of China-wood oil when dried without the beneficial effects of the condensation product.

Amyl alcohol may be substituted in the above blend in the same proportions; however, the drying time is longer under similar conditions.

In the case of geraniol, a sample of raw China-wood oil was treated with geraniol under similar conditions described in the above example, and the drying time was substantially the same as in the case of the blown oil.

Another example is, as follows:

| | Parts |
|---|---|
| Raw China-wood oil | 50 |
| Butyraldehyde | 50 |

The blended mixture was refluxed for five hours, and the condensed product dried into hard and smooth films at a temperature of about 220° F.

The aliphatic ketones and aliphatic unsaturated hydrocarbons, when condensed with oils having double bonds in conjugate arrangement, gave condensation products which dried very rapidly. An example is, as follows:

| | Parts |
|---|---|
| China-wood oil (raw or 7-second blown as determined by Gardiner-Holt test at 86° F.) | 50 |
| Mesityl oxide | 50 |

The mixed products were heated for five hours at 500° F. and the condensed product obtained dried into smooth and hard films in 1¾ hours in the case of the raw oil product and 24 hours in the case of the blown oil product, both films being dried at 220° F.

Methyl isopropyl ketone can be used as the condensing agent in the above formula in the same proportions as specified, and after heating the blend for 3½ hours under similar conditions, the product dried into smooth and hard films in two hours at 220° F.

An example of unsaturated aliphatic hydrocarbons is, as follows:

| | Parts |
|---|---|
| China-wood oil | 50 |
| Diisobutylene | 50 |

The mixture was heated under pressure for three hours and the resulting condensation product, when spread into films, dried into smooth and hard films in one to two hours at 220° F. A sample of octylene treated under the same conditions, dried in approximately the same time as diisobutylene. In another example, octylene and the oil were refluxed for ten hours, and the condensation product, when spread into films and heated to 220° F., dried into excellent films in approximately four hours.

The above examples, which shall be regarded as illustrative of the many possible formulations, clearly demonstrate that the condensation products formed in the oil through the condensation reaction between the oil having the double bonds in conjugate arrangement and the aliphatic compounds chosen from the groups of alcohols, aldehydes, ketones and unsaturated hydrocarbons as described, impart improved drying properties to the oils.

In my co-pending application #758,864, filed December 22, 1934, it was disclosed that it is practicable to mix several condensing agents with the oil and to react them simultaneously to form a complex molecule. Where, however, one reagent has a tendency to condense with the oil in such a way as to exclude further condensation with the other condensing agent, I prefer to react them successively, using first the agent which is not exclusive. In the co-pending application, I have disclosed, (1) condensation reactions between the oil having double bonds in conjugate arrangement and several cyclic compounds, and (2) also condensation reactions between the oil and a cyclic organic compound and a straight chain compound, thereby forming a complex molecule in each case. It was pointed out that the condensation reactions may occur in two different ways when more than one condensing compound is used (A) where the condensing agent or compound condenses with the oil and the condensation product reacts further with another condensing compound at some remaining reactive structure of the first condensing compound, and (B), where the two condensing compounds will not react with each other under the conditions, but will separately condense with the oil at different points of unsaturation in the oil molecule. Irrespective of how the reaction proceeds, complex molecules are formed which impart improved drying properties to the oil.

In the case of a plurality of aliphatic organic compounds, it has been found that the oil will condense with one of the straight chain compounds, and then the condensation product can be condensed with another straight chain compound with the formation of a complex molecule as described in the co-pending application. It is, of course, understood, as disclosed in the co-pending application, that a cyclic compound may be used in combination with an aliphatic compound in the same manner as a plurality of aliphatic compounds are used in the above description.

If it is desired to form a complex molecule, it is not necessary to add the several condensing compounds at the beginning of the reaction. In fact, it appears preferable that a single condensing compound be mixed with the oil and the condensation reaction started, and after the reaction has progressed to any point before becoming a solid mass, the reaction may be retarded by cooling the mixture. The additional condensing compounds may then be added and the reaction accelerated again by raising the temperature. The resulting product will be a condensed and complex structure which will impart beneficial drying properties to the oil.

An example of the complex structure is:

| | Parts |
|---|---|
| N-butyraldehyde | 25 |
| Octylene | 25 |
| China-wood oil (raw or blown) | 50 |

The preferable procedure of blending the ingredients is, as follows: The octylene and the China-wood oil are mixed and refluxed until the desired condensation has occurred. The condensed product is then cooled and the n-butyraldehyde is added. The mixture is now raised to the refluxing temperature and heated for about five hours. The resulting product is a condensed product which has a complex structure wherein, it is believed the butyraldehyde and the octylene are attached to different points of unsaturation in the oil chain. The condensed product dries very rapidly when spread into films and heated to about 220° F.

An example of a straight chain compound when used in combination with a cyclic compound, both of which are condensed with the oil to form a condensed product as described above, include cyclohexanone and n-butyraldehyde.

Numerous examples have been given indicating the wide application of the procedure of condensing oil having double bonds in conjugate arrangement with an aliphatic compound or compounds thereby imparting improved drying properties to the oil. The extent of the condensation depends on the condensing compound used, but regardless whether the condensation is partial or practically complete, the reaction falls within the scope of this invention since the invention embraces improved drying properties being imparted to the oil through the formation of a condensation product in the mixture. It seems that the presence of the formed condensation product is responsible for the improved drying properties of the oil.

Coating materials formed through the above-described reactions are especially useful in the manufacture of flooring materials, such as felt base and linoleum products. It is further useful in printing inks, plastic products, paints, enamels, varnishes, impregnating and insulating varnishes, etc. The several specific applications described are not to be construed as excluding other fields where coating materials are useful, but merely as examples of the numerous and wide application of the present invention.

Furthermore, I have expressed certain theories which I have formulated in the course of my investigations with this invention, which I believe may be helpful to those who subsequently apply and extend the application of my invention. However, I have not tested these theories to state them as correct, and since the invention is in no way dependent upon the correctness of any theories, it is to be understood that the scope of this invention and this application is not to be limited thereby.

I claim:

1. The method of imparting improved drying properties to oil which comprises condensing a mixture in which the condensation reactants consist of an oxidized drying oil having double bonds in conjugate arrangement and an organic compound chosen from the group consisting of straight chain alcohols containing six or more carbon atoms, straight chain saturated aldehydes containing three or more carbon atoms, straight chain ketones containing five or more carbon atoms and straight chain unsaturated hydrocarbons containing six or more carbon atoms.

2. The method of imparting improved drying properties to oil which comprises condensing at super-atmospheric temperature a mixture in which the condensation reactants consist of oxidized drying oil having double bonds in conjugate arrangement and an organic compound chosen from the group consisting of straight chain alcohols containing six or more carbon atoms, straight chain saturated aldehydes containing three or more carbon atoms, straight chain ketones containing five or more carbon atoms, and straight chain unsaturated hydrocarbons containing six or more carbon atoms.

3. The method of hardening drying oil which comprises condensing a mixture until the desired viscosity is obtained at super-atmospheric temperature in which the condensation reactants consist of an oxidized drying oil having double bonds in conjugate arrangement and an organic compound chosen from the group consisting of straight chain alcohols containing six or more carbon atoms, straight chain saturated aldehydes containing three or more carbon atoms, straight chain ketones containing five or more carbon atoms, and straight chain unsaturated hydrocarbons containing six or more carbon atoms, cooling the condensed mixture, manipulating the mixture to give it its final shape which it is to maintain when hardened in a finished product, thereafter hardening the product at super-atmospheric temperatures.

4. The method of imparting improved drying properties to oil which comprises condensing a mixture in which the condensation reactants consist of an oxidized drying oil having double bonds in conjugate arrangement and a plurality of organic compounds chosen from the group consisting of straight chain alcohols containing six or more carbon atoms, straight chain saturated aldehydes containing three or more carbon atoms, straight chain ketones containing five or more carbon atoms, and straight chain unsaturated hydrocarbons containing six or more carbon atoms.

5. The method of imparting improved drying properties to oil which comprises condensing at super-atmospheric temperature a mixture in which the condensation reactants consist of an oxidized drying oil having double bonds in conjugate arrangement and a pluralitly of organic compounds chosen from the group consisting of straight chain alcohols containing six or more carbon atoms, straight chain saturated aldehydes containing three or more carbon atoms, straight chain ketones containing five or more carbon atoms, and straight chain unsaturated hydrocarbons containing six or more carbon atoms.

6. The method of hardening drying oil which comprises condensing a mixture until the desired viscosity is obtained at super-atmospheric temperature in which the condensation reactants consist of an oxidized drying oil having double bonds in conjugate arrangement and a plurality of organic compounds chosen from the group consisting of straight chain alcohols containing six or more carbon atoms, straight chain saturated aldehydes containing three or more carbon atoms, straight chain ketones containing five or more carbon atoms, and straight chain unsaturated hydrocarbons containing six or more carbon atoms, cooling the condensed mixture, manipulating the mixture to give it its final shape which it is to maintain when hardened in a finished product, thereafter hardening the product at super-atmospheric temperatures.

7. A composition of matter which comprises a condensation mixture in which the condensation reactants consist of an oxidized drying oil having double bonds in conjugate arrangement and an organic compound chosen from the group consisting of straight chain alcohols containing six or more carbon atoms, straight chain saturated aldehydes containing three or more carbon atoms, straight chain ketones containing five or more carbon atoms and straight chain unsaturated hydrocarbons containing six or more carbon atoms.

8. A composition of matter which comprises a condensation mixture in which the condensation reactants consist of an oxidized drying oil having double bonds in conjugate arrangement and a plurality of organic compounds chosen from the group consisting of straight chain alcohols containing six or more carbon atoms, straight chain saturated aldehydes containing three or more carbon atoms, straight chain ketones containing five or more carbon atoms, and straight chain unsaturated hydrocarbons containing six or more carbon atoms.

WALTER J. KOENIG.